US011361410B2

(12) United States Patent
Wen et al.

(10) Patent No.: US 11,361,410 B2
(45) Date of Patent: Jun. 14, 2022

(54) IMAGE DENOISING IN SDR TO HDR IMAGE CONVERSION

(71) Applicant: Dolby Laboratories Licensing Corporation, San Francisco, CA (US)

(72) Inventors: Bihan Wen, Singapore (SG); Neeraj J. Gadgil, San Jose, CA (US); Guan-Ming Su, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 17/279,074

(22) PCT Filed: Sep. 23, 2019

(86) PCT No.: PCT/US2019/052425
§ 371 (c)(1),
(2) Date: Mar. 23, 2021

(87) PCT Pub. No.: WO2020/068666
PCT Pub. Date: Apr. 2, 2020

(65) Prior Publication Data
US 2021/0358089 A1     Nov. 18, 2021

Related U.S. Application Data

(60) Provisional application No. 62/735,288, filed on Sep. 24, 2018.

(30) Foreign Application Priority Data

Sep. 24, 2018 (EP) ..................... 18196232

(51) Int. Cl.
*G06T 7/00* (2017.01)
*G06T 5/00* (2006.01)
(Continued)

(52) U.S. Cl.
CPC .............. *G06T 5/002* (2013.01); *G06T 5/009* (2013.01); *G06T 5/40* (2013.01); *G06T 5/50* (2013.01);
(Continued)

(58) Field of Classification Search
CPC . G06T 2207/10016; G06T 5/002; G06T 5/40; G06T 2207/20208;
(Continued)

(56) References Cited

U.S. PATENT DOCUMENTS 8,023,762 B2   9/2011   Rhee
8,126,266 B2   2/2012   Kimura
(Continued)

FOREIGN PATENT DOCUMENTS

JP   2018509708 A   4/2018
WO   2017165494 A2   9/2017
(Continued)

OTHER PUBLICATIONS

Eilertsen, G. et al "Real-Time Noise-Aware Tone Mapping" ACM Transactions on Graphics, vol. 34, No. 6, Oct. 26, 2015, pp. 1-15.
(Continued)

*Primary Examiner* — Li Liu

(57) ABSTRACT

Methods and systems for image denoising when displaying high-dynamic-range images are described. Given an input image in a first dynamic range, and an input backward reshaping function mapping codewords from the first dynamic range to a second dynamic range, wherein the second dynamic range is equal or higher than the first dynamic range, statistical data based on the input image and the input backward reshaping function are generated to estimate the risk of noise artifacts in a target image in the second dynamic range generated by applying the input backward reshaping function to the input image. Using a
(Continued)

measure of the variance in codeword bins in histograms of consecutive input frames (denoted as temporal histogram variance), a modified backward reshaping function is generated, which when applied to the input image to generate the target image eliminates or reduces noise artifacts in the target image.

16 Claims, 5 Drawing Sheets

(51) Int. Cl.
*G06T 5/40* (2006.01)
*G06T 5/50* (2006.01)
*H04N 19/46* (2014.01)

(52) U.S. Cl.
CPC ............... *G06T 2207/10016* (2013.01); *G06T 2207/20182* (2013.01); *G06T 2207/20208* (2013.01); *H04N 19/46* (2014.11)

(58) Field of Classification Search
CPC . G06T 2207/10024; G06T 2207/20182; G06T 5/50; G06T 5/007; G06T 2207/20024; H04N 19/186; H04N 19/98; H04N 5/357; G06K 9/40; G06K 9/6212
See application file for complete search history.

(56) References Cited

U.S. PATENT DOCUMENTS

| | | | |
|---|---|---|---|
| 8,279,345 B2 | 10/2012 | Rossignol | |
| 8,488,915 B2 | 7/2013 | Jayant | |
| 9,256,924 B2 | 2/2016 | Watanabe | |
| 9,332,185 B2 | 5/2016 | Ho | |
| 9,959,599 B2 | 5/2018 | Choudhury | |
| 10,007,967 B2 | 6/2018 | Douady-Pleven | |
| 10,032,262 B2 | 7/2018 | Kheradmand | |
| 10,419,762 B2 | 9/2019 | Froehlich | |
| 2016/0343113 A1 | 11/2016 | Choudhury | |
| 2017/0140513 A1* | 5/2017 | Su | G06T 5/007 |
| 2017/0214916 A1 | 7/2017 | Lu | |
| 2018/0007356 A1 | 1/2018 | Kadu | |
| 2018/0020224 A1* | 1/2018 | Su | H04N 21/478 |
| 2018/0035058 A1 | 2/2018 | Thumpudi | |
| 2018/0098094 A1 | 4/2018 | Wen | |
| 2019/0156467 A1* | 5/2019 | Lasserre | G06T 5/009 |
| 2019/0222866 A1* | 7/2019 | Song | H04N 19/186 |

FOREIGN PATENT DOCUMENTS

| | | |
|---|---|---|
| WO | 2017201139 A1 | 11/2017 |
| WO | 2018044803 A1 | 3/2018 |
| WO | 2018049335 A1 | 3/2018 |
| WO | 2018231968 | 12/2018 |

OTHER PUBLICATIONS

ITU-R BT.2020 "Parameter Values for Ultra-High Definition television Systems for Production and International Programme Exchange" Aug. 2012.

ITU-R Recommendation ITU-R BT.709-6 "Parameter Values for the HDTV standards for Production and International Programme Exchange" Jun. 2015.

SMPTE ST 2084:2014 "High Dynamic Range Electro-Optical Transfer Function of Mastering Reference Displays".

* cited by examiner

IMAGE DENOISING IN SDR TO HDR IMAGE CONVERSION

CROSS-REFERENCE TO RELATED APPLICATIONS

This application claims priority to U.S. Provisional Patent Application No. 62/735,288, filed Sep. 24, 2018 and European Patent Application No. 18196232.5, filed Sep. 24, 2018, each of which is hereby incorporated by reference in its entirety.

TECHNOLOGY

The present invention relates generally to images. More particularly, an embodiment of the present invention relates to reducing noise in reconstructed high-dynamic range (HDR) images via proper adaptation of standard-dynamic range (SDR) to HDR reshaping functions based on a measure of temporal histogram variance in the SDR images.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the 14-15 orders of magnitude of the human visual system (HVS). In practice, the DR over which a human may simultaneously perceive an extensive breadth in intensity range may be somewhat truncated, in relation to HDR. As used herein, the terms visual dynamic range (VDR) or enhanced dynamic range (EDR) may individually or interchangeably relate to the DR that is perceivable within a scene or image by a human visual system (HVS) that includes eye movements, allowing for some light adaptation changes across the scene or image. As used herein, VDR may relate to a DR that spans 5 to 6 orders of magnitude. Thus, while perhaps somewhat narrower in relation to true scene referred HDR, VDR or EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). Using linear luminance coding, images where $n \leq 8$ (e.g., color 24-bit JPEG images) are considered images of standard dynamic range, while images where $n > 8$ may be considered images of enhanced dynamic range. HDR images may also be stored and distributed using high-precision (e.g., 16-bit) floating-point formats, such as the OpenEXR file format developed by Industrial Light and Magic.

Most consumer desktop displays currently support luminance of 200 to 300 $cd/m^2$ or nits. Most consumer HDTVs range from 300 to 500 nits with new models reaching 1000 nits ($cd/m^2$). Such conventional displays thus typify a lower dynamic range (LDR), also referred to as a standard dynamic range (SDR), in relation to HDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more).

In a traditional image pipeline, captured images are quantized using a non-linear opto-electronic function (OETF), which converts linear scene light into a non-linear video signal (e.g., gamma-coded RGB or YCbCr). Then, on the receiver, before being displayed on the display, the signal is processed by an electro-optical transfer function (EOTF) which translates video signal values to output screen color values. Such non-linear functions include the traditional "gamma" curve, documented in ITU-R Rec. BT.709 and BT. 2020, the "PQ" (perceptual quantization) curve described in SMPTE ST 2084, and the "HybridLog-gamma" or "HLG" curve described in and Rec. ITU-R BT. 2100.

As used herein, the term "forward reshaping" denotes a process of sample-to-sample or codeword-to-codeword mapping of a digital image from its original bit depth and original codewords distribution or representation (e.g., gamma or PQ or HLG, and the like) to an image of the same or different bit depth and a different codewords distribution or representation. Reshaping allows for improved compressibility or improved image quality at a fixed bit rate. For example, without limitation, reshaping may be applied to 10-bit or 12-bit PQ-coded HDR video to improve coding efficiency in a 10-bit video coding architecture. In a receiver, after decompressing the received signal (which may or may not be reshaped), the receiver may apply an "inverse (or backward) reshaping function" to restore the signal to its original codeword distribution and/or to achieve a higher dynamic range.

When converting SDR content into HDR content, noise which pre-existed in the SDR content and was deemed acceptable may be enhanced during the SDR to HDR conversion and now be deemed unacceptable. When visible, noise may be visually annoying and is often considered an indicator of low-quality encoding or of a low-quality display. As appreciated by the inventors here, improved techniques for image denoising when displaying video content, especially HDR content, are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1A:
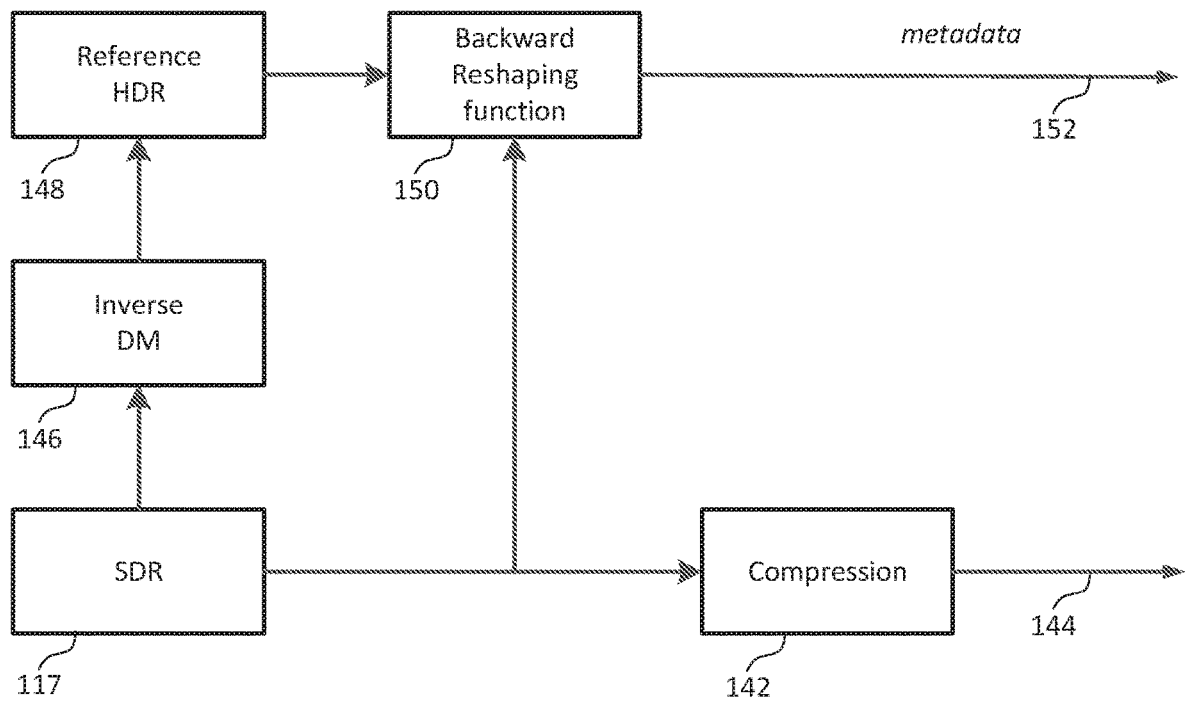
FIG. 1A depicts an example single-layer encoder for HDR data using a reshaping function according to an embodiment of this invention.

Reducing noise artifacts in HDR image and video content by proper adaptation of a reshaping image-mapping function is described herein. Given SDR images and a backward reshaping function, an updated reshaping function is derived so that an output HDR image generated by applying the updated reshaping function to the input image has reduced noise artifacts. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to reducing perceived noise in HDR pictures reconstructed from SDR pictures. In an embodiment, a system with a processor receives a sequence of images in the first dynamic range, and an input backward reshaping function which maps codewords from a first dynamic range to a second dynamic range, wherein the second dynamic range is equal or higher than the first dynamic range. For an input image in the sequence of input images, the processor generates statistical data based on the sequence of the input images and the input backward reshaping function to estimate the risk of noise artifacts in a target image in the second dynamic range, wherein the target image is generated by applying the input backward reshaping function to the input image, wherein the statistical data include a measure of temporal histogram variance of the input image. The statistical data may comprise computing, for the two or more input images of the sequence, corresponding two or more temporal histograms of codewords bins at corresponding times of the two or more input images in the sequence, and computing a measure of a variance of the computed temporal histograms. Next, the processor computes a measure of noise likelihood in the input image based on the statistical data and a first derivative of the backward reshaping function. If the measure of noise likelihood is higher than a threshold, then the processor adjusts the first derivative of the backward reshaping function to generate a modified first derivative of the backward reshaping function. Finally, the processor generates an output backward reshaping function based on the modified first derivative of the backward reshaping function, and replaces the input backward reshaping function with the output backward reshaping function.

In an embodiment, computing the temporal histogram of codewords bins comprises: determining a sliding window of M consecutive frames (or input images) in a video sequence, wherein the consecutive frames (or input images) include the input image; dividing the first dynamic range into N bins, wherein each bin (b) comprises an equal number of codewords in the first dynamic range; and computing a histogram of luma pixel values ($H_t(b)$) for all bins in the input image.

In an embodiment, computing the measure of the variance of the temporal histograms comprises: accessing histograms of luma pixels values in the remaining frames (or input images) in the sliding window; computing temporal derivatives of the histograms in the sliding window, wherein a temporal derivative of two histograms for frames (or input images) at time t and t−1 is computed as $$\Delta H_t(b) = H_t(b) - H_{t-1}(b), \text{ for } b = 1, 2, \ldots, N,$$

where $H_t(b)$ denotes the number of luma pixel values in the frame at time t with luma values in the b-th bin; and computing a variance ($J_t(b)$) of all temporal derivatives of the histograms in the sliding window.

Figure 1B:
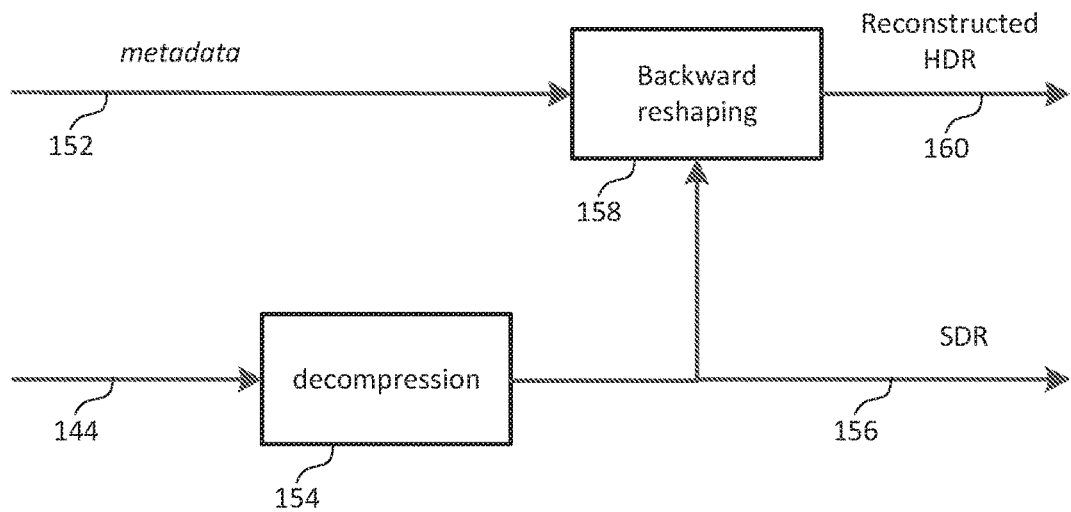
FIG. 1B depicts an example HDR decoder corresponding to the encoder of FIG. 1A, according to an embodiment of this invention.

In an embodiment, computing the variance ($J_t(b)$) of all temporal derivatives of the histograms in the sliding window comprises computing:

$$J_t(b) = \frac{1}{M} \sum_{i=0}^{M-1} (\Delta H_{t-i}(b) - \overline{H}_t(b))^2,$$

for $b = 1, 2, \ldots N$, where $\overline{H}_t(b) = \frac{1}{M} \sum_{i=0}^{M-1} \Delta H_{t-i}(b).$ Example HDR Coding System As described in U.S. patent application Ser. No. 15/725,101, (the '101 application') "Inverse luma/chroma mappings with histogram transfer and approximation," by B. Wen, et al., filed on Oct. 4, 2017, and published as U.S. Patent Application Publication U.S. 2018/0098094, which is incorporated herein by reference in its entirety, FIG. 1A and FIG. 1B illustrate an example single-layer inverse display management (SLiDM) codec framework using image reshaping. More specifically, FIG. 1A illustrates an example encoder-side codec architecture, which may be implemented with one or more computing processors in an upstream video encoder. FIG. 1B illustrates an example decoder-side codec architecture, which may also be implemented with one or more computing processors in one or more downstream video decoders.

Under this framework, SDR content (117) is encoded and transmitted in a single layer of a coded video signal (144) by an upstream encoding device that implements the encoder-side codec architecture. The SDR content is received and decoded, in the single layer of the video signal, by a downstream decoding device that implements the decoder-side codec architecture. Backward reshaping metadata (152) is also encoded and transmitted in the video signal with the SDR content so that HDR display devices can reconstruct HDR content based on the SDR content and the backward reshaping metadata.

In some embodiments, as illustrated in FIG. 1A, backward compatible SDR images, such as the SDR images (117), are received as input on the encoder side of the codec framework. Here, "backward compatible SDR images" may refer to SDR images that are specifically optimized or color graded for SDR displays.

A compression block 142 (e.g., an encoder implemented according to any known video coding algorithms, like AVC, HEVC, AV1, and the like) compresses/encodes the SDR images (117) in a single layer 144 of a video signal. By way of illustration but not limitation, an inverse dynamic-range mapping (DM) module 146—which may represent an SDR-to-HDR conversion tool—is used to convert the SDR images (117) to reference HDR images 148. In some embodiments, the inverse-DM module may also be referred to as an inverse tone-mapping tool. In some embodiments, instead of converting the SDR images (117) to the target HDR images (148), the HDR content (148) may be derived directly from the same source/input video content used to derive the SDR images (117) (not shown).

Regardless of whether the target HDR images (148) are derived from the SDR images (117) or not, a backward reshaping function generator 150 receives both of the SDR images (117) and the reference HDR images (148) as input, performs optimization to find out optimal backward reshaping functions such that backward reshaped images generated by backward reshaping the SDR images (117) with the optimal backward reshaping functions are as close to the reference HDR images (148) as possible. The optimal backward reshaping functions may be represented or specified with backward reshaping metadata 152.

Examples of backward reshaping metadata representing/specifying the optimal backward reshaping functions may include, but are not necessarily limited to only, any of: inverse tone mapping function, inverse luma mapping functions, inverse chroma mapping functions, lookup tables (LUTs), polynomials, inverse DM coefficients/parameters, etc. In various embodiments, luma backward reshaping functions and chroma backward reshaping functions may be derived/optimized jointly or separately, may be derived using cumulative distribution functions (CDF) histogram approximation/transfer techniques, and may be derived using a variety of techniques as described in the '101 application and/or in PCT Application Ser. No. PCT/US2018/037313, filed on Jun. 13, 2018, *"Efficient end-to-end single layer inverse display management coding,"* by N. J. Gadgil et al., which is incorporated herein by reference in its entirety.

The backward reshaping metadata (152), as generated by the backward reshaping function generator (150), may be multiplexed as part of the video signal 144.

In some embodiments, backward reshaping metadata (152) is carried in the video signal as a part of overall image metadata, which is separately carried in the video signal from the single layer in which the SDR images are encoded in the video signal. For example, the backward reshaping metadata (152) may be encoded in a component stream in the coded bitstream, which component stream may or may not be separate from the single layer (of the coded bitstream) in which the SDR images (117) are encoded.

Thus, the backward reshaping metadata (152) can be generated or pre-generated on the encoder side to take advantage of powerful computing resources and offline encoding flows (including but not limited to content adaptive multiple passes, look ahead operations, inverse luma mapping, inverse chroma mapping, CDF-based histogram approximation and/or transfer, etc.) available on the encoder side.

The encoder-side architecture of FIG. 1A can be used to avoid directly encoding the target HDR images (148) into coded/compressed HDR images in the video signal; instead, the backward reshaping metadata (152) in the video signal can be used to enable downstream decoding devices to backward reshape the SDR images (117) (which are encoded in the video signal) into reconstructed images that are identical to or closely/optimally approximate the reference HDR images (148).

In some embodiments, as illustrated in FIG. 1B, the video signal encoded with the SDR images (117) in the single layer (144) and the backward reshaping metadata (152) as a part of the overall image metadata are received as input on the decoder side of the codec framework. A decompression block 154 decompresses/decodes compressed video data in the single layer (144) of the video signal into the decoded SDR images (156). Decompression 154 typically corresponds to the inverse of compression 142. The decoded SDR images (156) may be the same as the SDR images (117), subject to quantization errors in the compression block (142) and in the decompression block (154), which may have been optimized for SDR display devices. The decoded SDR images (156) may be outputted in an output SDR video signal (e.g., over an HDMI interface, over a video link, etc.) to be rendered on an SDR display device.

In addition, a backward reshaping block 158 extracts the backward reshaping metadata (152) from the input video signal, constructs the optimal backward reshaping functions based on the backward reshaping metadata (152), and performs backward reshaping operations on the decoded SDR images (156) based on the optimal backward reshaping functions to generate the backward reshaped images (160) (or reconstructed HDR images). In some embodiments, the backward reshaped images represent production-quality or near-production-quality HDR images that are identical to or closely/optimally approximating the reference HDR images (148). The backward reshaped images (160) may be outputted in an output HDR video signal (e.g., over an HDMI interface, over a video link, etc.) to be rendered on an HDR display device.

In some embodiments, display management operations specific to the HDR display device may be performed on the backward reshaped images (160) as a part of HDR image rendering operations that render the backward reshaped images (160) on the HDR display device.

Example System for Reducing Noise Artifacts

With more and more HDR-capable television sets available in the market, there is an increased interest to convert legacy SDR content (e.g., movies and television series) into HDR content. SDR to HDR conversion may be fully-automatic (say, via an SDR to HDR conversion function (146)), fully-manual (say, by using the services of a professional color grader to regrade the content), or semi-automatic (say, via a combination of conversion tools and manual color grading). Regardless of the techniques being used, since the human visual system is far more sensitive to noise in brighter luminance, noise within certain dynamic ranges, while not noticeable in the SDR domain, can become rather noticeable in the HDR domain. Examples of such noise include "quantization noise," due to compressing the original content using a video codec (like MPEG-2, MPEG-4, AVC, and the like), "film noise," such as noise inherent in film, color noise and the like.

Noise corruption significantly lowers the HDR video quality and user experience, thus needs to be reduced. Though noise detection and denoising problems have been widely investigated in the past, most of the popular noise detection and denoising algorithms involve complicated operations, such as spatial filtering, subspace analysis, or sparse coding. It is hard or expensive to incorporate them into a real-time video processing pipeline while maintaining the original director's intent or "look," where some noise (say "film noise") may actually be acceptable or even desirable. Furthermore, video content is usually acquired under different settings, which makes the sources of the noise corruption heterogeneous; that is, the noise distribution and strength may be unknown and usually not uniform in space or time. Such setting makes the problem of noise detection and denoising quite challenging.

Figure 2:
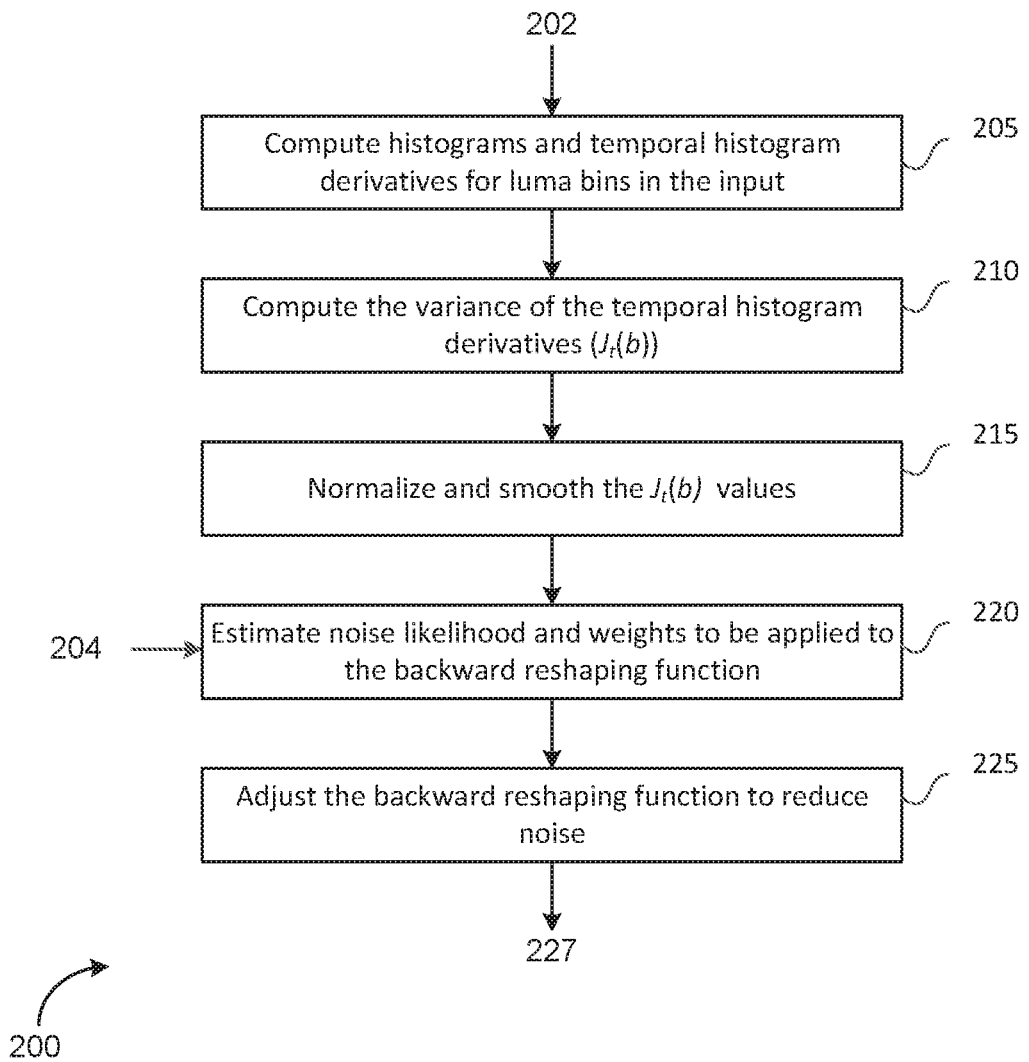
FIG. 2 depicts an example process for noise estimation and denoising according to an embodiment of this invention.

FIG. 2 depicts an example data flow (200) for detecting and reducing perceived noise according to an embodiment. As depicted in FIG. 2, the inputs to this workflow are a sequence of SDR images (202) (e.g., part of the input video sequence 117) and a reference backward look-up table (BLUT) or backward reshaping function 204, (e.g., one designed according to block 150 described earlier). The process will construct a new BLUT (227), which when applied to the SDR data in decoder (e.g., see FIG. 1B) will reduce the perceived noise in the resulting HDR image (e.g., 160).

The proposed method works with any valid reference BLUT which is designed to be applied on an SDR image to produce HDR output. For example, one condition for a valid BLUT requires that a reshaping function must be monotonically non-decreasing. Hence the proposed methodology is agnostic of the method used to generate the reference BLUT (204).

The proposed method will also work if the input SDR image (202) is replaced by a VDR or HDR image of lower dynamic range than the target HDR image (e.g., HDR image 160).

Let $I_s$ be the input SDR image having P luma pixels of B-bit depth (e.g., B=10). The total number of SDR codewords is given by $N_s=2^B$. Let this luma codeword space be divided in N bins (e.g., N=512) containing equal number of codewords in each bin. For the t-th frame in a video sequence, let $f_t(s)$ denote the reference backward reshaping function, mapping codewords from the SDR representation to codewords in an HDR representation. In some embodiments the function may be expressed as a look-up table denoted as BLUT. In some embodiments, without limitation, $f_t(s)$ may specify a reference mapping from an SDR codeword to its corresponding normalized (between 0 and 1) HDR codeword. In this document, s denotes a codeword index and b denotes a bin index.

Statistics Collection

In block 205, statistical data are collected from the SDR input (202) as follows.

a) Luma histogram of the SDR input.

Consider, without limitation, a picture or frame in a video sequence with luma pixel values (e.g., Y in a YCbCr representation) normalized to be within [0, 1], which is evenly divided into N bins, where $N \leq 2^B$. The histogram of the t-th frame at bin b, denoted as $H_t(b)$, represents the number of pixels in the t-th frame with normalized luma values between $$\left[\frac{(b-1)}{N}, \frac{b}{N}\right),$$

$b = 1, 2, \ldots, N.$ b) Temporal derivative of luma histograms.

Given two consecutive frames, at t and t−1, the temporal derivative of the luma histogram at time t and at bin b is defined as $$\Delta H_t(b) = H_t(b) - H_{t-1}(b), \quad (1)$$

for b=1, 2, . . . , N.

The motivation for computing a temporal derivative of the histograms is that it has been observed that when video contains simple motion, then the change of the histogram over time is relatively smooth and directional, whereas, additive noise yields changes in the histogram that are relatively random and in any direction. Thus, a function of the temporal derivative of frame histograms may be used to detect noise.

In step 210, the temporal histogram derivatives for each bin computed in step 205 are used to compute a measure of temporal histogram variance in each bin. For a temporal sliding window of length M (e.g., M=3), in an embodiment, the variance of $\Delta H_t(b)$ values within the temporal sliding window is computed as:

$$J_t(b) = \frac{1}{M}\sum_{i=0}^{M-1}(\Delta H_{t-i}(b) - \bar{H}_t(b))^2 b, \quad (2)$$

for all b, where $$\bar{H}_t(b) = \frac{1}{M}\sum_{i=0}^{M-1}\Delta H_{t-i}(b), \quad (3)$$

denotes the mean of the temporal derivatives of the histograms of the frames within the sliding window. In equation (2), $J_t(b)$ is computed using a window of past frames only (e.g., for M=3, frames at t−1 and t−2). In another embodiment, the sliding window may include both past and future frames (e.g., frames at t−1 and t+1).

It has been observed that values of $J_t(b)$ are strongly correlated with the likelihood of the presence of noise in each bin; however, the following observations indicate that using $J_t(b)$ directly may affect the accuracy of detection:

1. The height of $J_t(b)$ values depends on the number of pixels within the b-th bin in the target video frame, and may be unrelated to the strength of the noise in that bin.
2. Peaks at $J_t(b)$ may also be related to quick motion changes between consecutive frames, thus triggering false noise-detection alarms.
3. $J_t(b)$ values may reflect the noise likelihood using an SDR source. However, it is the mapped HDR video which usually will have noticeable noise. When converting from SDR to HDR, noise within different dynamic ranges is amplified with different scalers, which needs to be taken into account in the final noise-detection metric.

In an embodiment, these observations are addressed by applying steps 215 and 220 as follows.

To address observation (1) above, in step 215, the $J_t(b)$ values are first normalized as $$G_t(b) = \frac{J_t(b)}{\bar{H}_t(b)}, \quad (4)$$

$b = 1, 2, \ldots, N,$ so that $G_t(b)$ represents noise presence without being influenced by the number of pixels in bin b. Then, the normalized values are smoothened by a low-pass filter to reduce the number of false-positive noise detections. In an embodiment, a 21-tap low-pass filter with a Gaussian kernel and σ=15 was used; however, alternative low-pass filters known in the art may be used without limitation. Thus $$\overline{G_t}(b) = LPF(G_t(b)), \; b=1,2,\ldots,N. \quad (5)$$

Figure 3A:
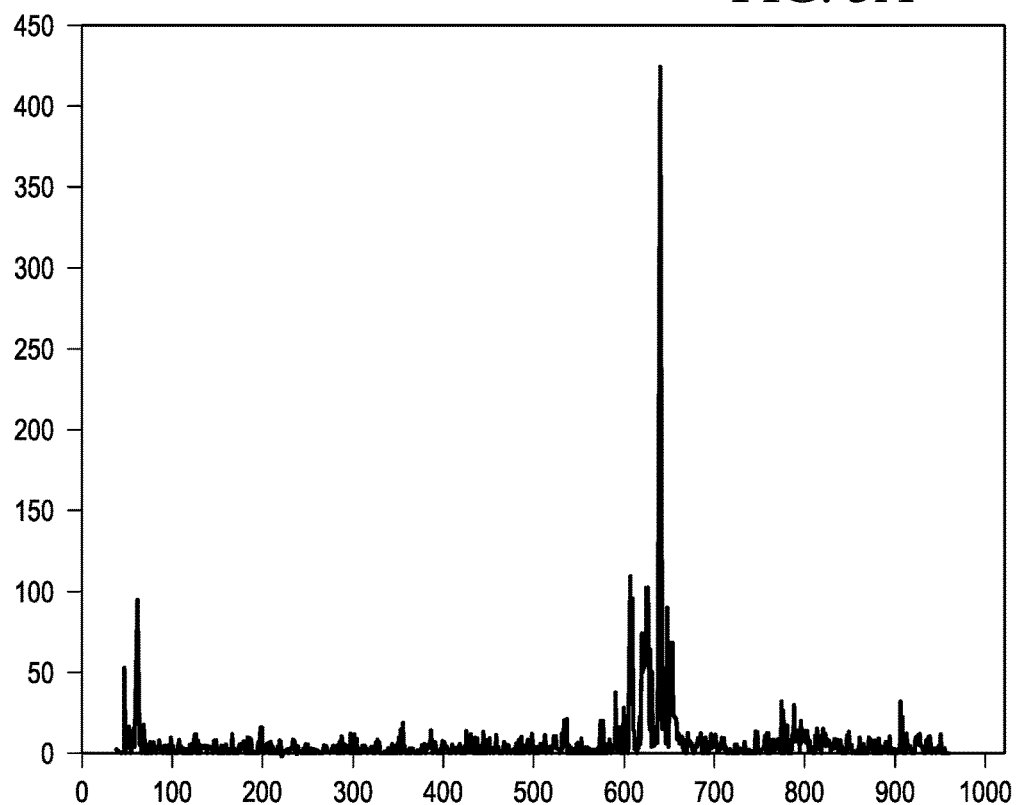
FIG. 3A depicts an example plot of the normalized variance of temporal histograms according to an embodiment of this invention.
Figure 3B:
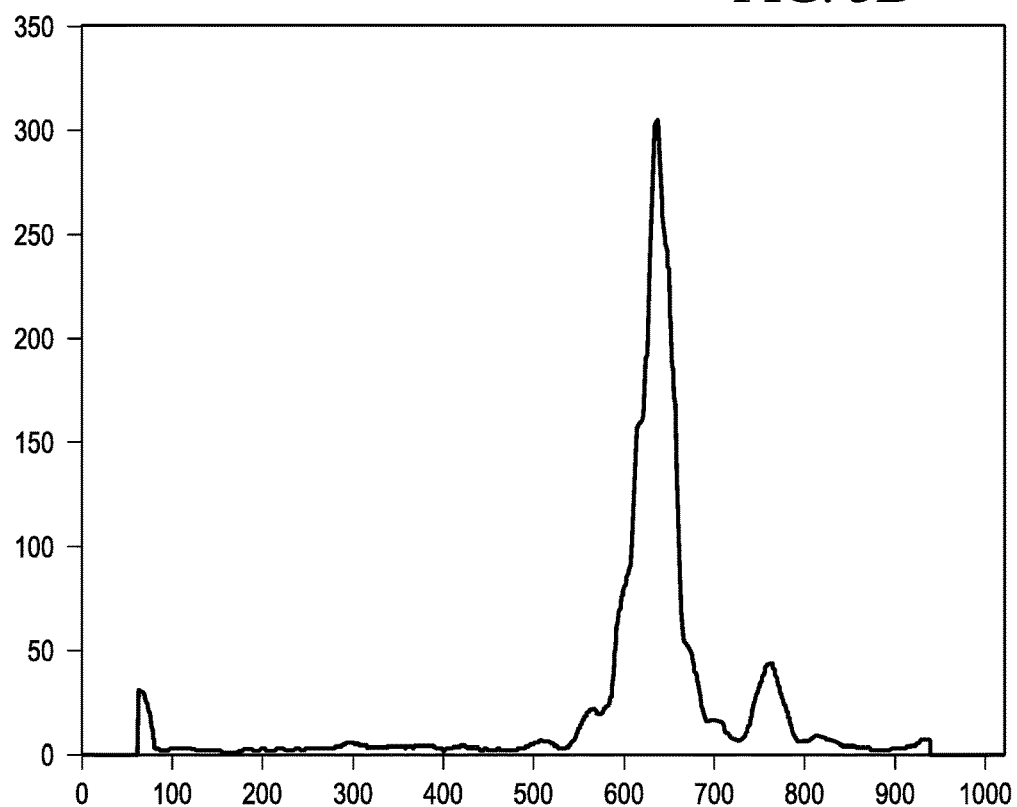
FIG. 3B depicts an example plot of the smoothed variance of temporal histograms according to an embodiment of this invention.
Figure 3C:
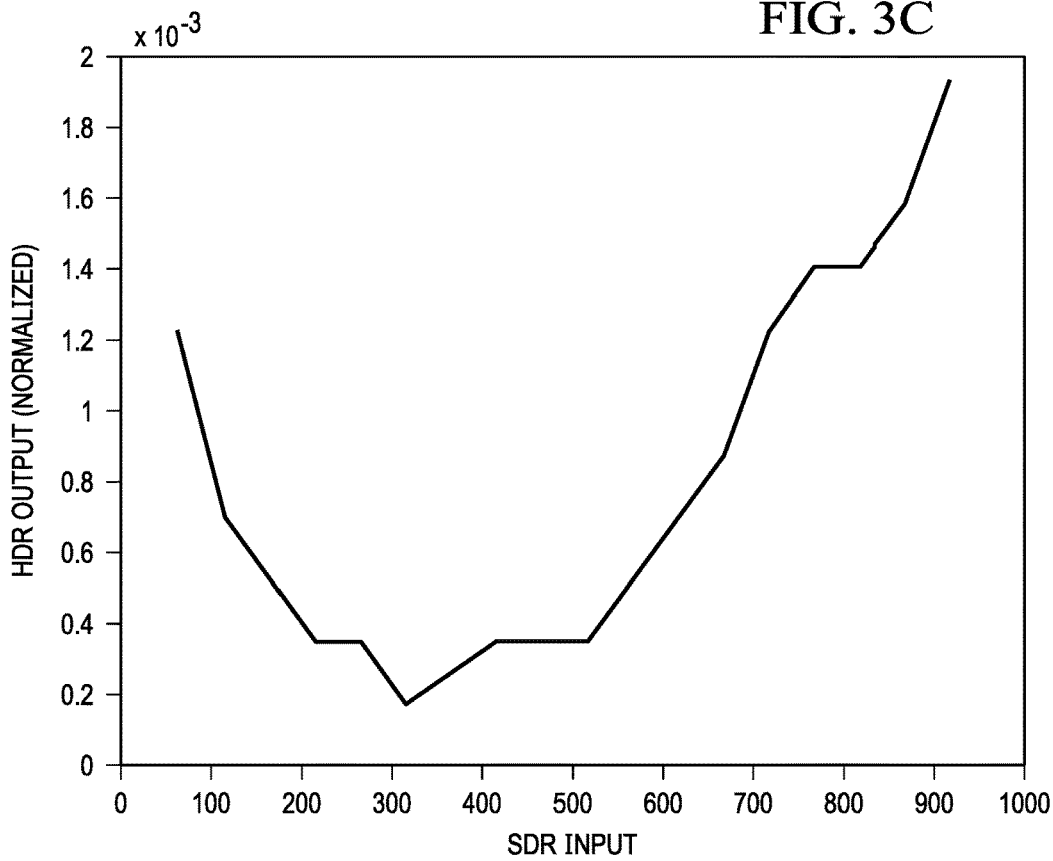
FIG. 3C depicts an example plot of an original first derivative of a backward reshaping function.
Figure 3D:
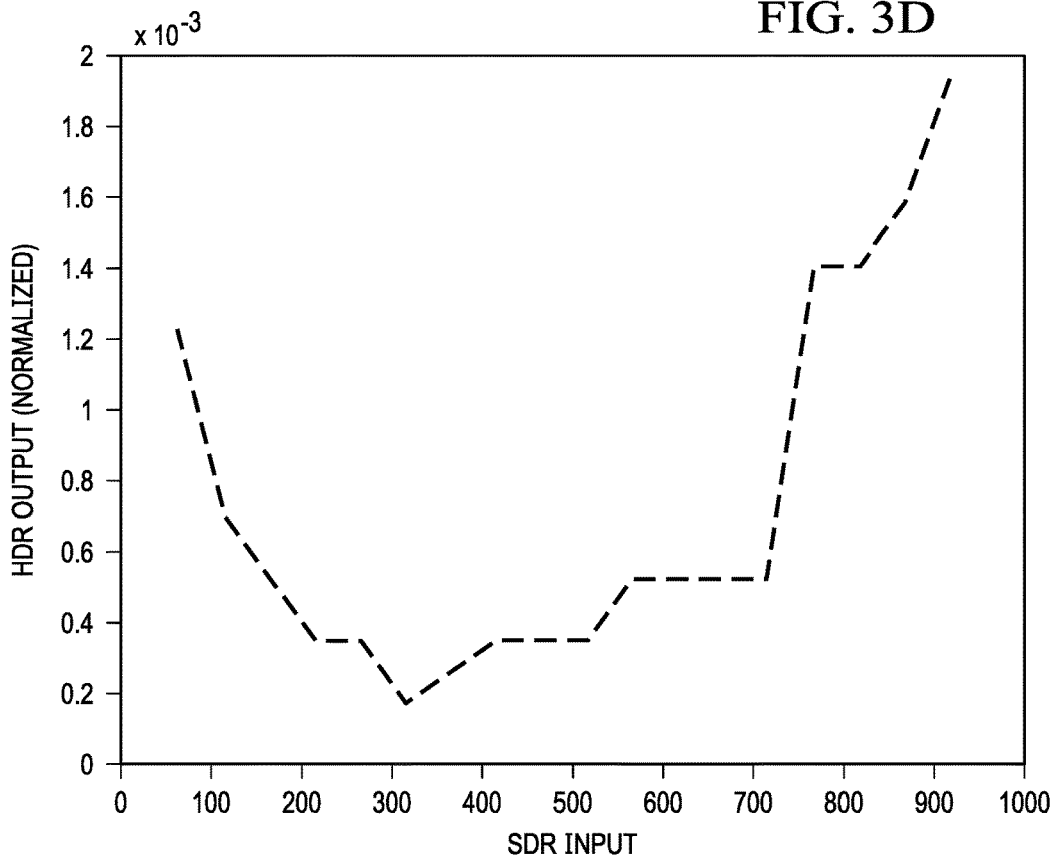
FIG. 3D depicts an example plot of a modified version of the first derivative of a backward reshaping function as adapted for image denoising according to an embodiment of this invention.
Figure 3E:
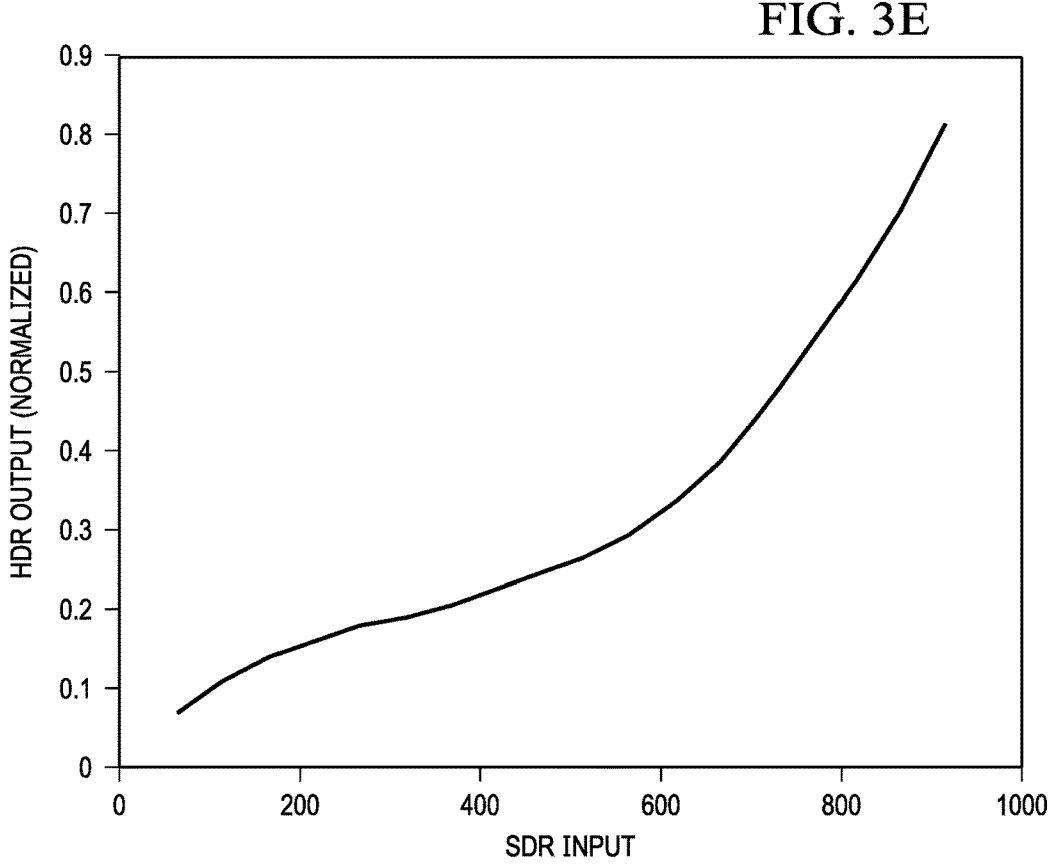
FIG. 3E an example plot of an original backward reshaping function.
Figure 3F:
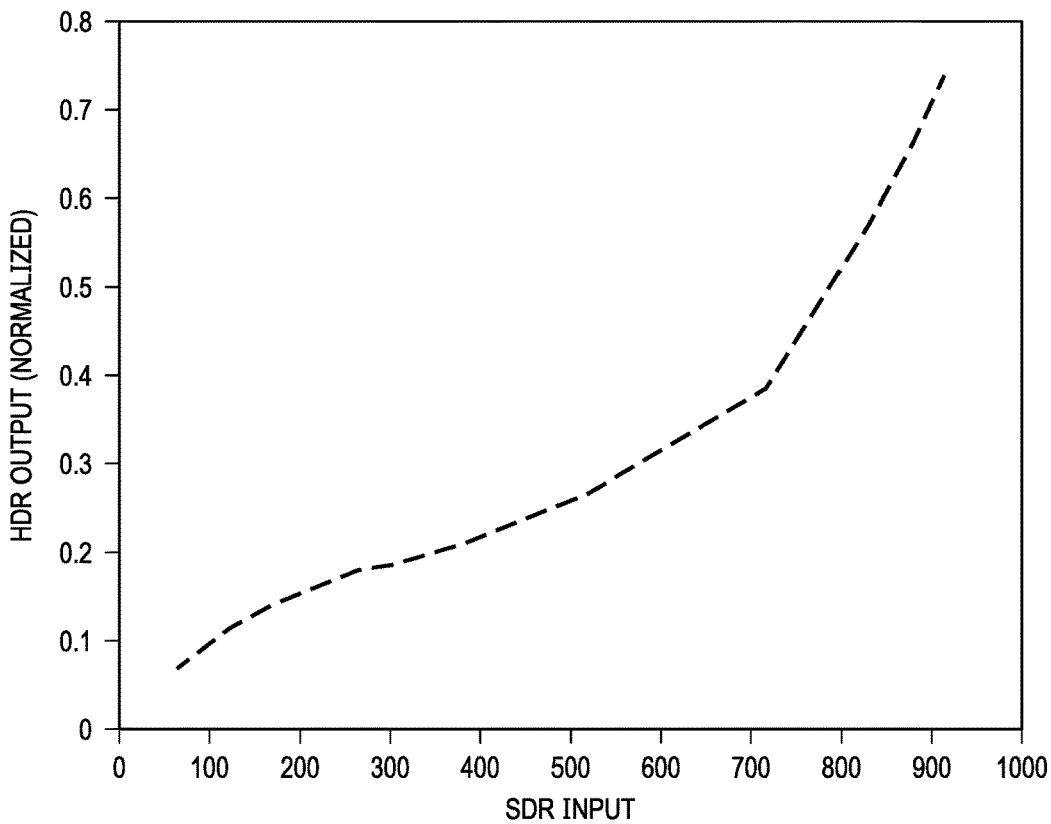
FIG. 3F depicts an example plot of a modified backward reshaping function, as adapted for image denoising according to an embodiment of this invention.

As an example, FIG. 3A depicts an example plot of $G_t(b)$ for 1024 bins, and FIG. 3B depicts an example of the corresponding $G_t(b)$ plot when using a Gaussian low-pass filter.

As discussed earlier, when converting from SDR to HDR, noise within different dynamic ranges is amplified with different scalers, thus, in an embodiment, in step 220, the filtered $G_t(b)$ values are scaled by the first derivative of the backward reshaping function $f_t(s)$ (204), thus $$L_t(b) = \overline{G_t}(b) f'_t(b), \; b=1,2,\ldots,N, \quad (6)$$

where $f'_t(b)$ denotes the first derivative of $f_t(s)$ at bin b. Given $L_t(b)$ values, which represent the likelihood of noise in bin b, the final step (225) is to adjust the backward reshaping function to reduce the influence of noise. To accommodate for scene-based changes in the incoming video, in an embodiment, $L_t(b)$ may be averaged over the whole scene. Thus, given a scene with K frames, a scene-based metric of noise likelihood may be denoted as $$L(b) = \frac{1}{K} \sum_{k=1}^{K} L_k(b), \quad (7)$$
$$b = 1, \ldots, 2.$$

Empirically, it was observed that the noise behavior is relatively consistent within the whole scene; however, if the video demonstrates time varying noise behavior, one can also sub-divide the scene into two or more sub-scenes.

Given L(b) values, b=1, 2, . . . , N, in an embodiment, a simple thresholding operation may be applied to classify pixel regions as noisy or noise-free. For example, given a threshold C (e.g., $C=6\times10^{-3}$), if L(b)<C; then there is no noise in bin b
else, there is noise in bin b.

Given the relationship between perceived noise and the derivative of the backward reshaping function, in an embodiment, to reduce noise, the following relationship is applied:

if $L(b) \geq C$, then $$\hat{f}'_t(b) = (1-\alpha) f'_t(b), \; b=1,2,\ldots,N, \quad (8)$$

where $0 \leq \alpha \leq 1$ denotes a constant which allows adjusting the degree of denoising, and $\hat{f}'_t(b)$ denotes a modified version of the first derivative the backward reshaping function. In some embodiments, when generating $\hat{f}'_t(b)$, additional constrains may be imposed so that the output HDR still maintains an HDR look. For example, one may impose:
  a lower bound for $\hat{f}'_t(b)$; e.g., $\hat{f}'_t(b) > g_{min}$, where $g_{min}$ is a predetermined threshold (e.g., $g_{min}=2.5*10^{-6}$) so that the HDR video does not lose local textures or details; or
  a maximum budget G (e.g., G=0.2526) such that:

$$\Sigma_b f'_t(b) - \Sigma_b \hat{f}'_t(b) < G, \quad (9)$$

which attempts to enforce maintaining the overall brightness and dynamic range in the HDR output.

Given the modified derivative of the backward reshaping function $\hat{f}'_t(b)$, the corresponding modified backward reshaping function $\hat{f}_t(b)$ (or NewBLUT 227) may be generating using simple integration, or $$\hat{f}_t(b) = \hat{f}_t(0) + \Sigma_{j=1}^{b-1} \hat{f}'_t(j), \; b=1,2,\ldots,N. \quad (10)$$

The modified BLUT is continuous and monotonically increasing; however, the gradient of the modified BLUT may be discontinuous, which may bring potential issues for coding. Thus, in an embodiment, one may apply an optional smoothing step (e.g., via low-pass filtering) to the modified BLUT $\hat{f}_t(b)$ and before using it replace the original BLUT.

From a computational point of view, it is certainly far more efficient to implement the proposed noise estimation and denoising steps as part of an encoder (e.g., as part of generating the backward reshaping function 150). In such a scenario, the transmitted backward reshaping function (e.g., via metadata 152) will have been already adapted according to the noise-estimation characteristics of the source SDR (117); however, the process may also be performed as part of a decoder. In such a scenario, the noise estimation step will need to be based on the decompressed SDR signal 156. Given the original backward reshaping function, as generated by metadata (152), the decoder could modify it based on the estimated noise characteristics of SDR signal 156 before applying it to generate the reconstructed HDR signal 160.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to denoising, such as those described herein. The computer and/or IC may compute, any of a variety of parameters or values that relate to denoising as described herein. The image and video dynamic range extension embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement denoising methods as described above by executing software instructions in a program memory accessible to the processors. The invention may also be provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to image denoising for HDR images are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following enumerated example embodiments (EEEs):

EEE1. In a video processing system comprising one or more processors, a method for reducing noise, the method comprising:
  receiving a sequence of input images (202) in a first dynamic range;
  for an input image in the sequence of input images:
    receiving an input backward reshaping function (204) (BLUT) mapping codewords from the first dynamic range to a second dynamic range, wherein the second dynamic range is equal or higher than the first dynamic range;
    generating (205) based on the sequence of input images and the input backward reshaping function statistical data for the input image to estimate the risk of noise artifacts in a target image in the second dynamic range, wherein the target image is generated by applying the input backward reshaping function to the input image, wherein the statistical data include a measure of temporal histogram variance of the input image;
    computing (220) a measure of noise likelihood in the input image based on the statistical data;
    computing a first derivative of the backward reshaping function;
    if the measure of noise likelihood is higher than a threshold then adjusting the first derivative of the backward reshaping function to generate a modified first derivative of the backward reshaping function;
    generating an output backward reshaping function based on the modified first derivative of the backward reshaping function; and
  replacing the input backward reshaping function with the output backward reshaping function.

EEE2. The method of EEE1, further comprising:
  in an encoder, encoding the sequence of input images to generate a coded bitstream and transmitting to a decoder the output backward reshaping function and the coded bitstream.

EEE3. The method of EEE1 or EEE2, wherein the first dynamic range comprises a standard dynamic range and the second dynamic range comprises a high dynamic range.

EEE4. The method of any preceding EEEs, wherein generating the measure of temporal histogram variance of the input image comprises:
  determining a sliding window of M consecutive frames in the video sequence, wherein the consecutive frames include the input image;
  dividing the first dynamic range into N bins, wherein each bin (b) comprises an equal number of codewords in the first dynamic range;
  computing a histogram of luma pixel values ($H_t(b)$) for all bins in the input image;
  accessing histograms of luma pixels values in the remaining frames in the sliding window;
  computing temporal derivatives of the histograms in the sliding window, wherein a temporal derivative of two histograms for frames at time t and t−1 is computed as $$\Delta H_t(b) = H_t(b) - H_{t-1}(b), \text{ for } b = 1, 2, \ldots, N,$$

where $H_t(b)$ denotes the number of luma pixel values in the frame at time t with luma values in the b-th bin; and
  computing a variance ($J_t(b)$) of all temporal derivatives of the histograms in the sliding window.

EEE5. The method of EEE4, wherein computing the variance ($J_t(b)$) of all temporal derivatives of the histograms in the sliding window comprises computing:

$$J_t(b) = \frac{1}{M} \sum_{i=0}^{M-1} (\Delta H_{t-i}(b) - \bar{H}_t(b))^2,$$

for $b = 1, 2, \ldots N$, where $\bar{H}_t(b) = \frac{1}{M} \sum_{i=0}^{M-1} \Delta H_{t-i}(b)$.

EEE6. The method of EEE4 or EEE5, further comprising computing a normalized variance of the $J_t(b)$ value $$G_t(b) = \frac{J_t(b)}{H_t(b)},$$

$b = 1, 2, \ldots, N,$ wherein $H_t(b)$ denotes the histogram of luma pixel values for bin b in the input image.

EEE7. The method of any one of EEE4 to EEE6, further comprising computing;

$$\bar{G}_t(b) = LPF(G_t(b)), b = 1, 2, \ldots, N,$$

wherein LPF( ) denotes a low-pass filter function.

EEE8. The method of any preceding EEEs, wherein computing the measure of noise likelihood in the input image based on the statistical data comprises:
  dividing the first dynamic range into N bins, wherein each bin (b) comprises an equal number of codewords in the first dynamic range; and
  computing $$L_t(b) = \bar{G}_t(b) f_t'(b), b = 1, 2, \ldots, N,$$

wherein $\bar{G}_t(b)$ denotes the measure of temporal histogram variance of the input image in bin b, and $f_t'(b)$ denotes the first derivative of the backward reshaping function in bin b.

EEE9. The method of EEE8, further comprising computing an average of $L_t(b)$ values across all frames in a scene in the sequence of input images which includes the input image.

EEE10. The method of EEE9, wherein computing the average of $L_t(b)$ values across all K frames in a scene comprises:

$$L(b) = \frac{1}{K}\sum_{k=1}^{K} L_k(b),$$

$$b = 1, 2, \ldots, N,$$

where $L(b)$ denotes the measure of noise likelihood in bin b.

EEE11. The method of EEE10, wherein adjusting the first derivative of the backward reshaping function to generate a modified first derivative of the backward reshaping function comprises computing:

if $L(b) \geq C$, then $$\hat{f}_t'(b) = (1-\alpha)f_t'(b), \ b=1,2,\ldots,N,$$

where $0 \leq \alpha \leq 1$ denotes a constant, $\hat{f}_t'(b)$ denotes the modified first derivative of the backward reshaping function, and C is a noise threshold.

EEE12. The method of EEE11, wherein generating an output backward reshaping function based on the modified first derivative of the backward reshaping function comprises computing:

$$\hat{f}_t(b) = f_t(0) + \sum_{j=1}^{b-1} \hat{f}_t'(j), \ b=1,2,\ldots,N,$$

where $\hat{f}_t(b)$ denotes the output backward reshaping function in bin b.

EEE13. The method of any preceding EEEs, further comprising:

in a decoder, applying the output backward reshaping function to the input image to generate an output image in the second dynamic range.

EEE14. A non-transitory computer-readable storage medium having stored thereon computer-executable instructions for executing with one or more processors a method in accordance with any one of the EEEs 1-13.

EEE15. An apparatus comprising a processor and configured to perform any one of the methods recited in any of the EEEs 1-13.

What is claimed is:

1. A method for reducing noise, the method comprising:
receiving a sequence of input images in a first dynamic range;
for an input image in the sequence of input images:
receiving an input backward reshaping function (BLUT) mapping codewords from the first dynamic range to a second dynamic range, wherein the second dynamic range is equal or higher than the first dynamic range;
generating statistical data for the input image based on the sequence of input images and the input backward reshaping function, wherein the statistical data for the input image is applied to estimate a risk of noise artifacts in a target image in the second dynamic range, wherein the target image is generated by applying the input backward reshaping function to the input image, wherein the statistical data include computing, for two or more input images of the sequence of input images, corresponding two or more temporal histograms of codewords bins at corresponding times of the two or more input images in the sequence of input images, and computing a measure of a variance of the computed temporal histograms;
computing a measure of noise likelihood in the input image based on the statistical data;
computing a first derivative of the input backward reshaping function;
if the measure of noise likelihood is higher than a threshold then adjusting the first derivative of the input backward reshaping function to generate a modified first derivative of the input backward reshaping function for reducing the noise in the target image;
generating an output backward reshaping function based on the modified first derivative of the input backward reshaping function; and
replacing the input backward reshaping function with the output backward reshaping function.

2. The method of claim 1, further comprising:
in an encoder, encoding the sequence of input images to generate a coded bitstream and transmitting to a decoder the output backward reshaping function and the coded bitstream.

3. The method of claim 1, wherein the first dynamic range comprises a standard dynamic range and the second dynamic range comprises a high dynamic range.

4. The method of claim 1, wherein computing the temporal histogram of codewords bins comprises:
determining a sliding window of M consecutive frames in a video sequence, wherein the consecutive frames include the input image;
dividing the first dynamic range into N bins, wherein each bin (b) comprises an equal number of codewords in the first dynamic range; and
computing a histogram of luma pixel values ($H_t(b)$) for all bins in the input image.

5. The method of claim 4, wherein computing the measure of the variance of the temporal histograms comprises:
accessing histograms of luma pixels values in the remaining frames in the sliding window;
computing temporal derivatives of the histograms in the sliding window, wherein a temporal derivative of two histograms for frames at time t and t−1 is computed as $$\Delta H_t(b) = H_t(b) - H_{t-1}(b), \ \text{for } b=1,2,\ldots,N,$$

where $H_t(b)$ denotes the number of luma pixel values in the frame at time t with luma values in the b-th bin; and
computing a variance ($J_t(b)$) of all temporal derivatives of the histograms in the sliding window.

6. The method of claim 5, wherein computing the variance ($J_t(b)$) of all temporal derivatives of the histograms in the sliding window comprises computing:

$$J_t(b) = \frac{1}{M}\sum_{i=0}^{M-1} (\Delta H_{t-i}(b) - \overline{H}_t(b))^2,$$

for $b = 1, 2, \ldots N,$ where $\overline{H}_t(b) = \frac{1}{M}\sum_{i=0}^{M-1} \Delta H_{t-i}(b).$ 7. The method of claim 5, further comprising computing a normalized variance of the $J_t(b)$ value $$G_t(b) = \frac{J_t(b)}{H_t(b)}, b = 1, 2, \ldots, N,$$

wherein $H_t(b)$ denotes the histogram of luma pixel values for bin b in the input image.

8. The method of claim 7, further comprising computing;

$$\overline{G}_t(b) = LPF(G_t(b)), b=1,2,\ldots,N,$$

wherein LPF( ) denotes a low-pass filter function.

9. The method of claim 1, wherein computing the measure of noise likelihood in the input image based on the statistical data comprises:
dividing the first dynamic range into N bins, wherein each bin (b) comprises an equal number of codewords in the first dynamic range; and
computing $$L_t(b) = \overline{G}_t(b) f'_t(b), b=1,2,\ldots,N,$$

wherein $\overline{G}_t(b)$ denotes the measure of the variance of the temporal histogram of the input image in bin b, and $f_t'(b)$ denotes the first derivative of the input backward reshaping function in bin b.

10. The method of claim 9, further comprising computing an average of $L_t(b)$ values across all frames in a scene in the sequence of input images which includes the input image.

11. The method of claim 10, wherein computing the average of $L_t(b)$ values across all K frames in a scene comprises:

$$L(b) = \frac{1}{K} \sum_{k=1}^{K} L_k(b), b = 1, 2, \ldots, N,$$

where L(b) denotes the measure of noise likelihood in bin b.

12. The method of claim 11, wherein adjusting the first derivative of the input backward reshaping function to generate a modified first derivative of the input backward reshaping function comprises computing:

if $L(b) \geq C$, then $$\hat{f}_t'(b) = (1-\alpha) f_t'(b), b=1,2,\ldots,N,$$

where $0 \leq \alpha \leq 1$ denotes a constant, $\hat{f}_t'$ denotes the modified first derivative of the backward reshaping function, and C is a noise threshold.

13. The method of claim 12, wherein generating an output backward reshaping function based on the modified first derivative of the input backward reshaping function comprises computing:

$$f_t(b) = f_t(0) + \sum_{j=1}^{b-1} \hat{f}_t'(j), b=1,2,\ldots,N,$$

where $f_t(b)$ denotes the output backward reshaping function in bin b.

14. The method of claim 1, further comprising:
in a decoder, applying the output backward reshaping function to the input image to generate an output image in the second dynamic range.

15. A non-transitory computer-readable storage medium having stored thereon computer-executable instructions for executing with one or more processors a method in accordance with claim 1.

16. An apparatus comprising a processor and configured to perform the method recited in claim 1.

* * * * *

UNITED STATES PATENT AND TRADEMARK OFFICE
CERTIFICATE OF CORRECTION

PATENT NO. : 11,361,410 B2
APPLICATION NO. : 17/279074
DATED : June 14, 2022
INVENTOR(S) : Bihan Wen et al.

It is certified that error appears in the above-identified patent and that said Letters Patent is hereby corrected as shown below:

In the Claims

Column 16

Claim 12, Line 14, replace "$\hat{f}_t$" with -- $\hat{f}_t(b)$ --

Claim 13, Line 21, replace "$f_t(b) = f_t(0) + \Sigma_{j=1}^{b-1} \hat{f}_t(j)$" with -- $\hat{f}_t(b) = f_t(0) + \Sigma_{j=1}^{b-1} \hat{f}_t(j)$ --

Claim 13, Line 22, replace "$f_t(b)$" with -- $\hat{f}_t(b)$ --

Signed and Sealed this
Thirtieth Day of July, 2024

Katherine Kelly Vidal
*Director of the United States Patent and Trademark Office*